United States Patent
Oonishi et al.

(10) Patent No.: US 10,755,222 B2
(45) Date of Patent: Aug. 25, 2020

(54) WORK MANAGEMENT APPARATUS, WORK DEFECT PREVENTION PROGRAM, AND WORK DEFECT PREVENTION METHOD

(71) Applicant: Hitachi Systems, Ltd., Shinagawa-ku, Tokyo (JP)

(72) Inventors: Kentarou Oonishi, Tokyo (JP); Daisuke Katsumata, Tokyo (JP); Tooru Sugimoto, Tokyo (JP); Naoto Murayama, Tokyo (JP); Nobuhiro Ihori, Tokyo (JP); Naoto Miyao, Tokyo (JP); Takayuki Fujiwara, Tokyo (JP); Shinya Iguchi, Tokyo (JP); Hiroaki Takatsuki, Tokyo (JP)

(73) Assignee: Hitachi Systems, Ltd., Tokyo (JP)

( * ) Notice: Subject to any disclaimer, the term of this patent is extended or adjusted under 35 U.S.C. 154(b) by 926 days.

(21) Appl. No.: 15/318,094

(22) PCT Filed: Jun. 13, 2014

(86) PCT No.: PCT/JP2014/065780
§ 371 (c)(1),
(2) Date: Dec. 12, 2016

(87) PCT Pub. No.: WO2015/189995
PCT Pub. Date: Dec. 17, 2015

(65) Prior Publication Data
US 2017/0132554 A1    May 11, 2017

(51) Int. Cl.
*G06Q 10/06* (2012.01)
*G06K 9/00* (2006.01)

(52) U.S. Cl.
CPC ... *G06Q 10/06398* (2013.01); *G06K 9/00355* (2013.01); *G06Q 10/06395* (2013.01); *G06K 9/00389* (2013.01)

(58) Field of Classification Search
CPC ....... G06Q 10/06398; G06Q 10/06395; G06K 9/00355; G06K 9/00389
See application file for complete search history.

(56) References Cited

U.S. PATENT DOCUMENTS

| | | | |
|---|---|---|---|
| 2013/0257690 A1 | 10/2013 | Fujimaki | |
| 2017/0124338 A1* | 5/2017 | Oonishi | .......... H04L 9/088 |
| 2018/0328890 A1* | 11/2018 | Lopez | .......... G02B 27/017 |

FOREIGN PATENT DOCUMENTS

| | | |
|---|---|---|
| JP | 9-319539 A | 12/1997 |
| JP | 2011-164694 A | 8/2011 |

(Continued)

OTHER PUBLICATIONS

Google Translation of JP 2012-181809 A (JP document provided by Applicant) (Year: 2103).*

(Continued)

*Primary Examiner* — Bobbak Safaipour
(74) *Attorney, Agent, or Firm* — Crowell & Moring LLP

(57) ABSTRACT

Provided is a technology for supporting work carried out under a unique work environment. A work management apparatus includes: an image reception unit configured to receive an image from another apparatus; an instruction target specification unit configured to specify a device instructed by a predetermined instruction method in the received image; and a display instruction unit configured to instruct the another apparatus to display the device specified by the instruction target specification unit in a different display mode from a display mode of another device contained in the image.

11 Claims, 14 Drawing Sheets

(56) References Cited

FOREIGN PATENT DOCUMENTS

| JP | 2012-181809 A | 9/2012 |
|---|---|---|
| JP | 2013-205920 A | 10/2013 |

OTHER PUBLICATIONS

International Search Report (PCT/ISA/210) issued in PCT Application No. PCT/JP2014/065780 dated Jul. 15, 2014 with English translation (4 pages).

* cited by examiner

FIG. 2

WORK INFORMATION STORAGE UNIT 140

| EXECUTION DATE | EXECUTION TIME | RECORD INFORMATION TYPE | RECORD FILE NAME | PRE-CHANGE STATE | POST-CHANGE STATE | WORK RESULT |
|---|---|---|---|---|---|---|
| 140A | 140B | 140C | 140D | 140E | 140F | 140G |
| 20140330 | 14:10 | DETERMINATION | | | | OK |
| 20140330 | 14:11 | VIDEO | A2.mov | | | OK |
| 20140330 | 14:12 | AUDIO | A3.mp3 | | | OK |
| 20140330 | 14:13 | VIDEO | A4.mov | | | OK |
| 20140330 | 14:14 | AUDIO | A5.mp3 | | | OK |
| 20140330 | 14:15 | SENSOR | A6.txt | 10V/m | 2V/m | OK |
| ... | | | | | | |

FIG. 3

WORK HISTORY STORAGE UNIT 251

| DEVICE IDEN-TIFIER 251A | EXE-CUTION DATE 251B | EXE-CUTION TIME 251C | WORK IDEN-TIFIER 251D | RECORD INFORMATION TYPE 251E | RECORD FILE NAME 251F | SIMULTANEOUS WORK DEVICE 251G | PRE-CHANGE STATE 251H | POST-CHANGE STATE 251J | WORK RESULT 251K |
|---|---|---|---|---|---|---|---|---|---|
| 001 | 20140330 | 14:10 | A1 | DETERMINATION |  | 002 |  |  | OK |
| 001 | 20140330 | 14:11 | A2 | VIDEO | A2.mov | 002 |  |  | OK |
| 001 | 20140330 | 14:12 | A3 | AUDIO | A3.mp3 | 002 |  |  | OK |
| 002 | 20140330 | 14:13 | A4 | VIDEO | A4.mov | 001 |  |  | OK |
| 002 | 20140330 | 14:14 | A5 | AUDIO | A5.mp3 | 001 |  |  | OK |
| 001 | 20140330 | 14:15 | A6 | SENSOR | A6.txt | 002 | 10V/m | 2V/m | OK |
| ... |  |  |  |  |  |  |  |  |  |

FIG. 4

WORK PROCEDURE STORAGE UNIT 252

| 252A | 252B | 252C | 252D |
|---|---|---|---|
| WORK IDENTIFIER | WORKER | WORK CONTENT | CONFIRMATION IMAGE |
| A1 | WORKER A | ACQUIRE VIDEO OF WORK TARGET DEVICE AND CONFIRM DISPLAY OF CONFIRMATION OK | server1.jpg |
| ... | | | |

WORK MANAGEMENT APPARATUS, WORK DEFECT PREVENTION PROGRAM, AND WORK DEFECT PREVENTION METHOD

TECHNICAL FIELD

The present invention relates to a work management apparatus, a work defect prevention program, and a work defect prevention method.

BACKGROUND ART

Patent Literature 1 discloses "a standard work execution support apparatus including: a standard work information storage unit configured to pre-associate and store position information indicating a position of a worker's hand in image frames forming moving images of work performed in accordance with a standard work procedure with time information indicating a timing at which the hand is at the position indicated by the position information; an image analysis unit configured to generate position information indicating a position of another worker's hand in image frames forming moving images of work performed by the another worker captured by a video capture unit; a difference calculation unit configured to calculate a difference between a position indicated by position information corresponding to the time information stored in the standard work information storage unit and a position indicated by position information generated by the image analysis unit at a timing indicated by the time information in the moving images captured by the video capture unit, and a difference between the timing indicated by the time information corresponding to the position information stored in the standard work information storage unit and the timing at which the image analysis unit generated the position information indicating the position matching the position indicated by the position information based on the moving images captured by the video capture unit; and a superimposition unit configured to superimpose, when a calculation result by the difference calculation unit is more than a predetermined value, an image corresponding to the position information or time information stored in the standard work information storage unit on the moving images captured by the video capture unit, and display the superimposed image on display means."

CITATION LIST

Patent Literature

[PTL 1] Japanese Patent Application Publication No. 2011-164694

SUMMARY OF INVENTION

Technical Problem

With the above-mentioned technology, although the worker can be supported when performing standard work, it is difficult to support work carried out under an individual, specific, unique work environment.

It is an object of the present invention to provide a technology for supporting work carried out under a unique work environment.

Solution to Problem

This application includes a plurality of means for solving at least a part of the above-mentioned problem. Examples of those means are as follows. In order to solve the above-mentioned problem, according to one embodiment of the present invention, there is provided a work management apparatus including: an image reception unit configured to receive an image from another apparatus; an instruction target specification unit configured to specify a device instructed by a predetermined instruction method in the received image; and a display instruction unit configured to instruct the another apparatus to display the device specified by the instruction target specification unit in a different display mode from a display mode of another device contained in the image.

Further, the work management apparatus may further include a storage unit configured to store image information specifying a work procedure and a device to be a work target, and the display instruction unit may be configured to issue the instruction to the another apparatus when the device specified by the instruction target specification unit matches the device to be the work target.

Further, the work management apparatus may further include a device comparison unit configured to determine whether or not the device specified by the instruction target specification unit matches a device that is included in another image different from the image and that has been instructed by the predetermined instruction method, and the display instruction unit may be configured to instruct the another apparatus to display a comparison result obtained by the device comparison unit.

Further, in the work management device, the display instruction unit may be configured to instruct the another apparatus to display the device so that the display mode applied during processing for displaying the device differently from another device differs from a display mode applied when it has been determined by the device comparison unit that the device and the another device match.

Further, the work management apparatus may further include a device comparison unit configured to determine whether or not the device specified by the instruction target specification unit matches each of devices that are contained in a plurality of other images different from the image and that have been instructed by the predetermined instruction method, and the display instruction unit may be configured to instruct the another apparatus to display a comparison result obtained by the device comparison unit.

Further, in the work management device, the display instruction unit may be configured to instruct the another apparatus to display the device so that the display mode applied during processing for displaying the device differently from another device differs from a display mode applied when it has been determined by the device comparison unit that the device and the another device match.

Further, in the work management device, the display instruction unit may be configured to instruct the another apparatus to display a pre-change physical quantity and a post-change physical quantity when there has been a change of a predetermined amount or more in state information about the device representing a predetermined physical quantity.

Further, in the work management device, the instruction target specification unit may be configured to recognize a shape of a finger contained in the image, and specify a device present in a direction indicated by the shape on the image.

Further, in the work management device, the instruction target specification unit may be configured to recognize light having a predetermined frequency contained in the image, and specify a device present in a direction indicated by the light on the image.

Further, according to one embodiment of this application, there is provided a work defect prevention program configured to cause a computer to execute a procedure of supporting work defect prevention, the work defect prevention program being configured to cause the computer to function as control means, the work defect prevention program being configured to cause the computer to execute: an image reception step of receiving an image from another apparatus; an instruction target specification step of specifying a device instructed by a predetermined instruction method in the received image; and a display instruction step of instructing the another apparatus to display the device specified in the instruction target specification step in a different display mode from a display mode of another device contained in the image.

Further, according to one embodiment of this application, there is provided a work defect prevention method for supporting work defect prevention through use of a computer, the computer including a control unit, the work defect prevention method including: an image reception step of receiving, by the control unit, an image from another apparatus; an instruction target specification step of specifying, by the control unit, a device instructed by a predetermined instruction method in the received image; and a display instruction step of instructing, by the control unit, the another apparatus to display the device specified in the instruction target specification step in a different display mode from a display mode of another device contained in the image.

According to one embodiment of the present invention, it is possible to provide the technology for supporting work carried out under a unique work environment. However, problems, configurations, and advantageous effects other than those described above are clarified below based on the description of the following embodiments.

BRIEF DESCRIPTION OF DRAWINGS

FIG. 2 shows an example of a data structure stored in a work information storage unit.

FIG. 3 shows an example of a data structure stored in a work history storage unit.

FIG. 4 shows an example of a data structure stored in a work procedure storage unit.

DESCRIPTION OF EMBODIMENT

An embodiment using a work defect prevention system 1 to which a first embodiment of the present invention is applied is described below with reference to the drawings.

Figure 1:
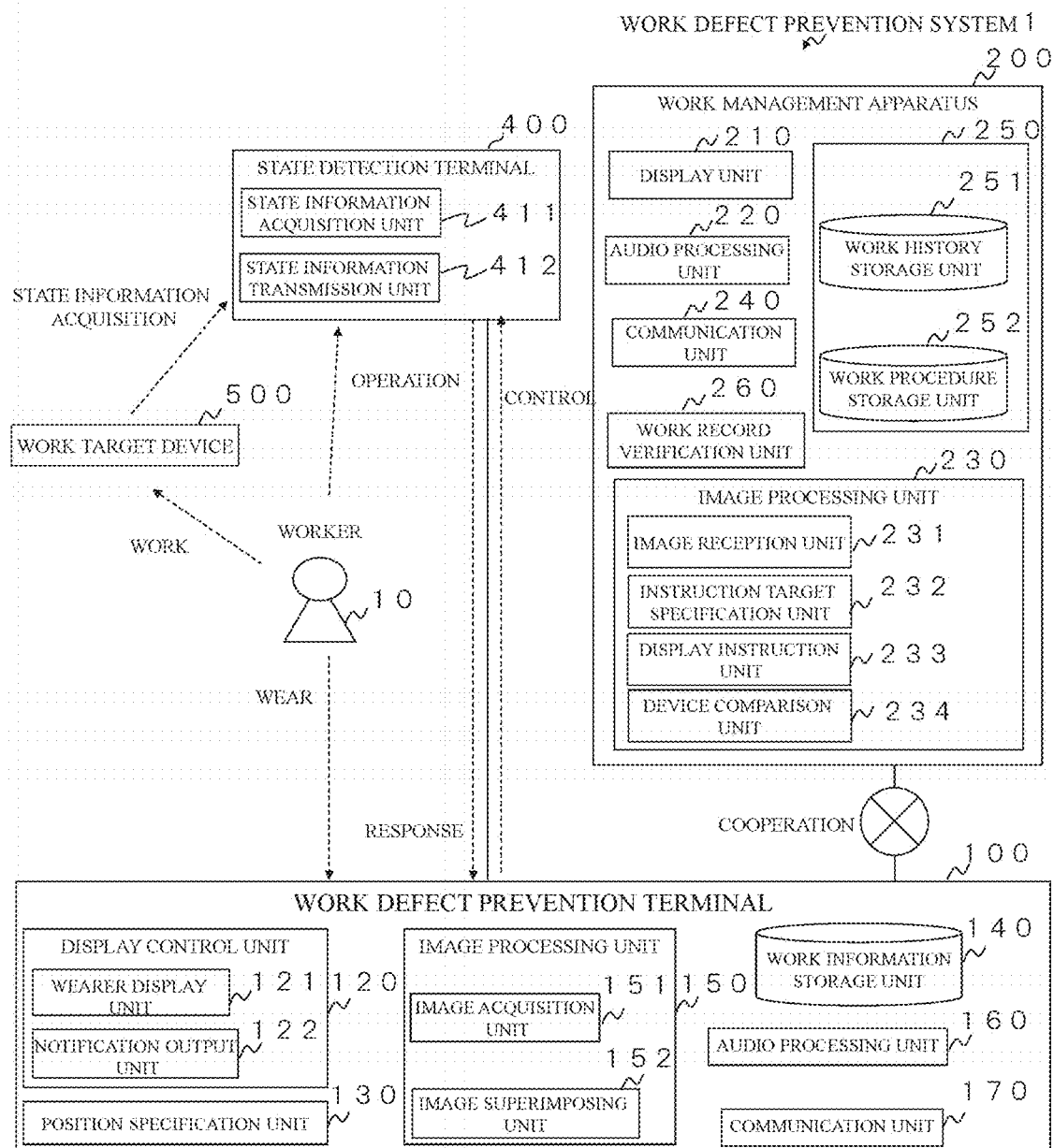
FIG. 1 illustrates a configuration example of a work defect prevention system according to an embodiment of the present invention.

FIG. 1 illustrates a configuration example of a work defect prevention system 1 according to the first embodiment of the present invention. The work defect prevention system 1 according to this embodiment includes a work defect prevention terminal 100, a work management apparatus 200, and a state detection terminal 400. In this system, a worker 10 performs predetermined work on a work target device 500 while wearing the work defect prevention terminal 100 on his/her body (e.g., when the work defect prevention terminal 100 is a glasses-type device or so-called smart glasses, the face). For example, the worker 10 performs work such as maintenance work, installation work, and inventory work of the work target device 500.

The work defect prevention terminal 100 is an apparatus also referred to as a so-called wearable device, which includes a computer in general that can be removably mounted on a part of the body of the worker. It is preferred that the work defect prevention terminal 100 be mounted on the worker, be capable of acquiring image information having the same or a wider-angle visual field than the worker, and be capable of acquiring audio information perceived by the worker. Smart glasses, which are one such type of so-called wearable device, tend to leave both hands of the wearer free when worn. Consequently, support of the worker aimed at improving work quality and the like can be carried out more efficiently. Note that, a plurality of work defect prevention terminals 100 are included in the work defect prevention system 1.

Note that, the work defect prevention terminal 100 may be a terminal owned by the worker 10, or may be a terminal lent to the worker from an organization that the worker 10 belongs to. The work management apparatus 200 performs the processing, such as image processing, that is required when supporting the work performed by the worker 10. The state detection terminal 400, which is communicably connected by a wire or wirelessly to the work defect prevention terminal 100, receives controls from the work defect prevention terminal 100 and acquires a predetermined physical quantity. Further, the state detection terminal 400 transmits the acquired physical quantity together with the response to the work defect prevention terminal 100.

The work defect prevention terminal 100 and the work management apparatus 200 are connected to each other via a network, such as a public wireless network or a mobile phone network. The work management apparatus 200, which is, for example, a server apparatus, a personal computer, or a mobile phone device including a so-called smartphone or tablet terminal, is a processing apparatus capable of communicating to/from another apparatus.

Further, as the predetermined physical quantity, the state detection terminal 400 acquires, for example, an electric field intensity and the like of a predetermined surrounding range. For example, when a network cable is physically connected in a manner that enables communication to/from a communications device, an electric field is formed around the cable. However, when the cable is disconnected from the communications device, the electric field disappears. Therefore, it can be said that by the worker 10 placing the state detection terminal 400 near the work target, the state detection terminal 400 can measure the intensity of the electric field and detect a plugged-in state of the cable.

The state detection terminal 400 is communicably connected to any one of the work defect prevention terminals 100 via a communication channel such as a wireless LAN, Bluetooth (trademark), a universal serial bus (USB) connection, or the like.

The work defect prevention terminal 100 includes a display control unit 120, a position specification unit 130, a work information storage unit 140, an image processing unit 150, an audio processing unit 160, and a communication unit 170.

The display control unit 120 includes a wearer display unit 121 and a notification output unit 122. The wearer display unit 121 provides display to the wearer of the work defect prevention terminal 100, namely, the worker 10. The wearer display unit 121 is an inner side display unit that is configured to display information superimposed on optical video through a lens to the wearer by projecting an image of visual display information onto a lens surface that is nearer to the wearer of the pair of glasses, for example.

The notification output unit 122 provides display to persons other than the wearer of the work defect prevention terminal 100, namely, persons other than the worker 10. The notification output unit 122 is an outer side display unit configured to show those who are capable of visually recognizing the wearer externally and the like that the work defect prevention terminal 100 is being operated by controlling the blinking of a light-emitting body, such as a light-emitting diode (LED), for example.

The position specification unit 130 is configured to receive satellite waves and specify the three-dimensional coordinates of a current location as the position where the work defect prevention terminal 100 is located. Specifically, the position specification unit 130 specifies the position where the work defect prevention terminal 100 is located using position information acquired by using an antenna to receive satellite waves transmitted from three or more satellites, such as global positioning system (GPS) satellites, global navigation satellite system (GLONASS) satellites, and the like, and calculating the three-dimensional coordinates of the current location based on the received information.

The work information storage unit 140 associates and stores record information about the work carried out by the worker 10 with the execution date and time. Specifically, the work information storage unit 140 stores audio and video information that is to serve as a record of the work content based on the execution date and time, along with information about whether or not a verification result of the work content is appropriate.

FIG. 2 shows a data structure of the work information storage unit 140. The work information storage unit 140 includes an execution date 140A, an execution time 140B, a record information type 140C, a record file name 140D, a pre-change state 140E, a post-change state 140F, and a work result 140G.

The execution date 140A is information specifying the day that the worker 10 carried out the work. The execution time 140B is information specifying the time when the work was carried out. The record information type 140C is information specifying the information format of the work record. The record file name 140D is information specifying the name of a file including the information relating to the work record. The pre-change state 140E is information specifying the physical quantity detected by the state detection terminal 400 before the work is carried out. The post-change state 140F is information specifying the physical quantity detected by the state detection terminal 400 after the work is carried out. The work result 140G is information representing a result of work for which there are no problems in the work result.

Returning to the description of FIG. 1, the image processing unit 150 includes an image acquisition unit 151 and an image superimposing unit 152. The image acquisition unit 151 is configured to acquire external images acquired by the work defect prevention terminal 100, namely, image information related to the field of view of the worker. More ideally, the image acquisition unit 151 is configured to acquire images in a range including the whole field of view of the worker.

When the image superimposing unit 152 receives from the work management apparatus 200 and the like information about an image, text, and the like to be superimposed and displayed, the image superimposing unit 152 outputs that information to the worker 10 so as to be superimposed on the field of view of the worker 10. In other words, for a wearable device such as a headset terminal configured to output a captured image so as to cover the field of view of the worker 10 with liquid crystal images and the like, the image superimposing unit 152 displays the information by providing a translucent layer on the captured image. When the wearable device is a glasses-type wearable device configured to output information so that the field of view of the worker 10 is partially semi-translucent, the image superimposing unit 152 displays the above-mentioned information.

The audio processing unit 160 is configured to acquire audio information external to the work defect prevention terminal 100, and store the acquired audio information in the work information storage unit 140 as an audio recording file. The communication unit 170 is configured to control communication to/from another apparatus. Specifically, it is preferred that the communication unit 170 be configured to control short-distance radio communication based on Bluetooth, a wireless LAN, near field communication (NFC), and the like. However, the communication unit 170 may also be configured to control a predetermined wired communication, such as USB.

The work management apparatus 200 includes a display unit 210, an audio processing unit 220, an image processing unit 230, a communication unit 240, a storage unit 250, and a work record verification unit 260.

The display unit 210 is configured to perform a display output to be used in operation and the like of the work management apparatus 200.

The audio processing unit 220 is configured to receive audio inputs to be used in operation and the like of the work management apparatus 200. Further, the audio processing unit 220 stores the received audio in the storage unit 250 as an audio file. In addition, when the audio processing unit 220 receives audio information transmitted from the work defect prevention terminal 100, the audio processing unit 220 receives the audio information as audio information required for confirmation of the work, and uses that information as information for advancing the work procedure to the next work.

The image processing unit 230 includes an image reception unit 231, an instruction target specification unit 232, a display instruction unit 233, and a device comparison unit 234. The image reception unit 231 is configured to receive image information from the work defect prevention terminal 100. The instruction target specification unit 232 is configured to specify a device instructed by a predetermined instruction method in the image received by the image reception unit 231. Specifically, the instruction target specification unit 232 is configured to recognize a shape of a finger of the worker 10 contained in the image, and based on a direction indicated by the shape of a tip portion of the finger, specify the instructed device. Note that, in a case in which the instruction target specification unit 232 receives an instruction by a laser pointer as the predetermined instruction method, the instruction target specification unit 232 may be configured to specify a device irradiated with laser light having a predetermined wavelength as the instructed device.

The display instruction unit 233 is configured to specify the information to be displayed on the wearer display unit 121, and instruct the work defect prevention terminal 100 to display that information. Specifically, the display instruction unit 233 is configured to instruct another apparatus to display the device specified by the instruction target specification unit 232 in a different display mode from the display mode of another device contained in the image. For example, the display instruction unit 233 is configured to specify, regarding the device specified by the instruction target specification unit 232, the position at which a target marker, which is a predetermined polygonal shape, is to be superimposed on an image, and instruct the work defect prevention terminal 100 to perform a superimposed display including that position. Further, when the device specified by the instruction target specification unit 232 matches the device to be the work target, the display instruction unit 233 issues an instruction to display the target marker to another apparatus.

Further, the display instruction unit 233 is configured to display the device in a different display mode applied during processing for displaying the device differently from another device from a display mode applied when it has been determined by the device comparison unit 234 that the device and the another device are similar. Specifically, the display instruction unit 233 is configured to display the device by adding a red target marker thereto during the processing for displaying the device differently from another device. In a case in which it is determined by the device comparison unit 234 that the device and the another device are similar, the display instruction unit 233 is configured to issue an instruction to display the device by changing to a green target marker.

In addition, the display instruction unit 233 is configured to instruct another apparatus to display a pre-change physical quantity and a post-change physical quantity when there has been a change of a predetermined amount or more in state information about the device representing a predetermined physical quantity.

The device comparison unit 234 is configured to determine, as a comparison between two or more images, whether or not the devices that are contained in the respective images and have been specified by the instruction target specification unit 232 have a predetermined level of similarity or more. Note that, a similarity standard may be, for example, for shape, the similarity in positional relationship of a characteristic point, for color, the existence of a pattern in the same color, and for size, the similarity to an estimated value calculated from the distance and angle of view of an object. Alternatively, the similarity standard may be based on a combination of those. The communication unit 240 is configured to control communication to/from another apparatus.

The storage unit 250 includes a work history storage unit 251 and a work procedure storage unit 252.

FIG. 3 shows a data structure of the work history storage unit 251. The work history storage unit 251 includes a device identifier 251A, an execution date 251B, an execution time 251C, a work identifier 251D, a record information type 251E, a record file name 251F, a simultaneous work device 251G, a pre-change state 251H, a post-change state 251J, and a work result 251K.

Of the information included in the work history storage unit 251, the execution date 251B, the execution time 251C, the record information type 251E, the record file name 251F, the pre-change state 251H, the post-change state 251J, and the work result 251K are the same information as the information having the same name in the work information storage unit 140. The device identifier 251A is information identifying the work target device. The work identifier 251D is information specifying the work that has been carried out. The simultaneous work device 251G is information identifying a device on which work has been carried out at the same time as the work target device.

FIG. 4 shows a data structure of the work procedure storage unit 252. The work procedure storage unit 252 is configured to store at least image information specifying the work procedure and the device to be the work target. The work procedure storage unit 252 includes a work identifier 252A, a worker 252B, work content 252C, and a confirmation image 252D.

The work identifier 252A is information specifying the work to be carried out. The worker 252B is information specifying the worker 10 who is to carry out the work. The work content 252C is information in which a detailed procedure of the work is indicated in a natural language. However, the work content 252C is not limited to this example, and may be content represented by moving images, still images, or the like. The confirmation image 252D is a still image of the appearance of the work target device that has been associated with the target on which the work is to be carried out.

Returning to the description of FIG. 1, the work record verification unit 260 is configured to verify whether or not the work information has been properly executed in line with the work procedure, specify the verification result as a work result, and store the verification result in the work result 251K of the work history storage unit 251.

The state detection terminal 400 includes a state information acquisition unit 411 and a state information transmission unit 412. The state information acquisition unit 411 is configured to acquire a predetermined physical quantity. The state information transmission unit 412 is configured to transmit the state information acquired by the state information acquisition unit 411 to the associated work defect prevention terminal 100.

Figure 5:
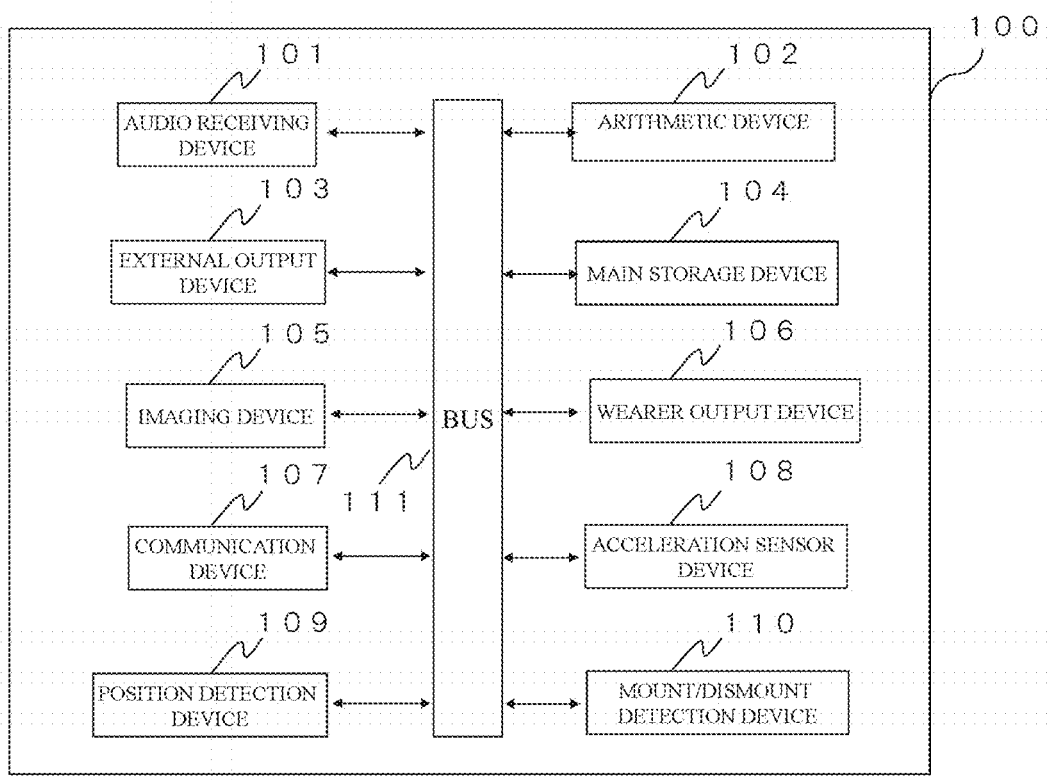
FIG. 5 illustrates a hardware configuration of a work defect prevention terminal.

FIG. 5 illustrates a hardware configuration of the work defect prevention terminal 100. The work defect prevention terminal 100 includes at least an audio receiving device 101, an arithmetic device 102, an external output device 103, a main storage device 104, an imaging device 105, a wearer output device 106, a communication device 107, an acceleration sensor device 108, a position detection device 109, a mount/dismount detection device 110, and a bus 111 configured to connect the respective devices. In addition, the work defect prevention terminal 100 may also include a contact input device. Note that, for example, in the case of a wearable device in the form of a pair of glasses, the contact input device may be configured to, although is not limited to, receive a touch on a temple portion of the pair of glasses as a click input, and receive a touch made in a sliding direction as a scroll input.

The audio receiving device 101 is configured to collect sound, including spoken sound produced by the worker 10 wearing the work defect prevention terminal 100, and ambient sound. For example, the audio receiving device 101 is one or a plurality of microphones.

The arithmetic device 102 is, for example, an arithmetic device such as a central processing unit (CPU).

The external output device 103 performs an output from an LED lamp and the like by, when the work defect prevention terminal 100 is being worn, emitting light so that the light is visible externally to the wearer, specifically, so that the light is externally visible.

The main storage device 104 is, for example, a memory device such as a random access memory (RAM).

The imaging device 105 is a camera device configured to acquire video information having the same or a wider-angle visual field than the worker wearing the work defect prevention terminal 100.

The wearer output device 106 is a display device, such as a projection device configured to project an image on an optical lens surface so that the image can be seen by the wearer, or a semi-transmissive display device provided so as to match the optical lens surface. However, the wearer output device 106 is not limited to those examples, and may be, for example, a display device capable of radiating light so as to form an image on the retina of the worker.

The communication device 107 is a device configured to transmit and receive information by establishing a communication channel to/from other apparatus, such as the work management apparatus 200, via a wireless network and the like.

The acceleration sensor device 108 is a device configured to detect changes in the movement and orientation of the worker 10, who is the wearer, by specifying an acceleration direction and a magnitude of acceleration by acquiring acceleration in a predetermined dimension.

The position detection device 109 is a device configured to receive satellite waves transmitted from three or more satellites, such as GPS satellites, using an antenna, and calculate the three-dimensional coordinates of the current location based on the received information.

The mount/dismount detection device 110 is a device configured to specify whether or not the worker 10 has mounted, or has removed, the work defect prevention terminal 100. For example, the work record apparatus 100 may be configured to include electrodes on the temples of a pair of glasses, and specify that the work defect prevention terminal 100 is mounted when there is an object (i.e., a person's head) connecting the electrodes on the temples, and specify that the work defect prevention terminal 100 has been removed when there is not an object connecting the electrodes.

The display control unit 120 of the work defect prevention terminal 100 is realized by the external output device 103 and the wearer output device 106. The position specification unit 130 is realized by the position detection device 109. The work information storage unit 140 is realized by the main storage device 104. The image processing unit 150 is realized by a program configured to cause the arithmetic device 102 to perform processing and the imaging device 105. This program is stored in the main storage device 104, or in a ROM device (not shown). When executed, the program is loaded into the main storage device 104, and executed by the arithmetic device 102. Further, the audio processing unit 160 is realized by a program configured to cause the arithmetic device 102 to perform processing and the audio receiving device 101. The communication unit 170 is realized by the communication device 107.

The hardware configuration of the work defect prevention terminal 100 is described above.

Figure 6:
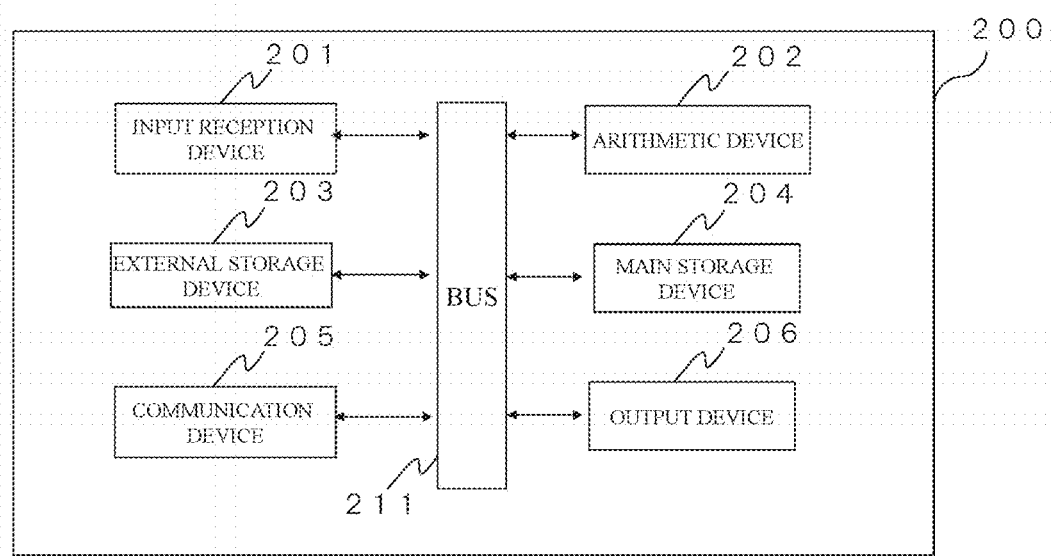
FIG. 6 illustrates a hardware configuration of a work management apparatus.

FIG. 6 illustrates a hardware configuration of the work management apparatus 200. The work management apparatus 200 includes at least an input reception device 201, an arithmetic device 202, an external storage device 203, a main storage device 204, a communication device 205, an output device 206, and a bus 211 configured to connect the various devices.

Various types of input device may be used as the input reception device 201, such as a keyboard, a mouse, a touch panel, and the like.

The arithmetic device 202 is, for example, an arithmetic device such as a CPU.

The external storage device 203 is a non-volatile storage device capable of storing digital information, such as a so-called hard disk (hard disk drive), a solid state drive (SSD), or a flash memory.

The main storage device 204 is, for example, a memory device such as a RAM.

The communication device 205 is a device, such as a network card, configured to transmit and receive information by establishing a communication channel to/from another apparatus, such as the work defect prevention terminal 100, via a network and the like.

The output device 206 is a display device, such as a liquid crystal display and an organic EL (electroluminescence) display, for example.

The display unit 210 of the work management apparatus 200 is realized by the output device 206. The audio processing unit 220, the image processing unit 230, and the work record verification unit 260 are realized by programs configured to cause the arithmetic device 202 to perform processing. Those programs are stored in the main storage device 204, or in a ROM device (not shown). When executed, the programs are loaded into the main storage device 204, and executed by the arithmetic device 202.

Further, the communication unit 240 is realized by the communication device 205. The storage unit 250 is realized by the external storage device 203 and the main storage device 204. The hardware configuration of the work management apparatus 200 is described above.

Figure 7:
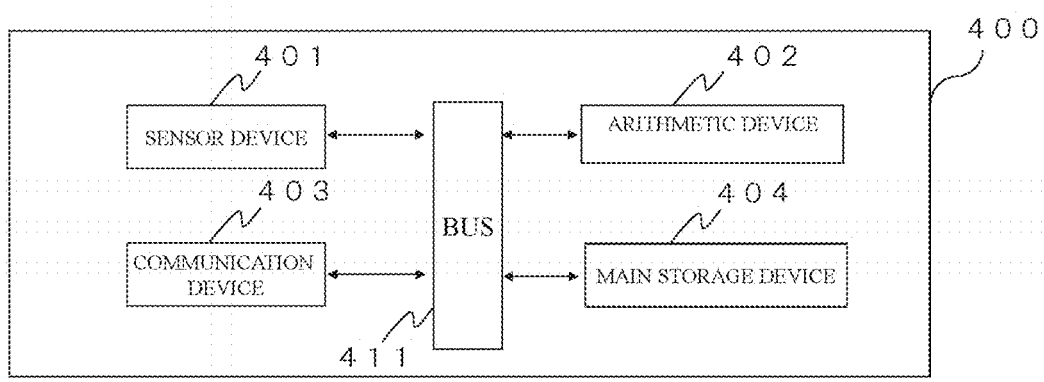
FIG. 7 illustrates a hardware configuration of a state detection terminal.

FIG. 7 illustrates a hardware configuration of the state detection terminal 400. The state detection terminal 400 includes at least a sensor device 401, an arithmetic device 402, a communication device 403, a main storage device 404, and a bus 405 configured to connect the various devices.

Various types of sensor devices configured to detect a predetermined physical quantity may be used as the sensor device 401. The sensor device 401 may be any of a temperature sensor, a humidity sensor, an electric field sensor, an acceleration sensor, a magnetic sensor, a distance sensor, a velocity sensor, and the like, or a combination of those.

The arithmetic device 402 is, for example, an arithmetic device such as a CPU.

The communication device 403 is a device configured to transmit and receive information by establishing a communication channel to/from another apparatus, such as the work defect prevention terminal 100, via a network and the like.

The main storage device 404 is, for example, a memory device such as a RAM.

The state information acquisition unit 411 of the state detection terminal 400 is realized by the sensor device 401 and a program configured to cause the arithmetic device 402 to perform processing. This program is stored in the main storage device 404, or in a ROM device (not shown). When executed, the program is loaded into the main storage device 404, and executed by the arithmetic device 402.

Further, the state information transmission unit 412 is realized by the communication device 403. The hardware configuration of the state detection terminal 400 is described above.

Note that, each of the configurations of the work defect prevention terminal 100, the work management apparatus 200, and the state detection terminal 400 may be classified into even more constituent elements based on the processing content. Further, one constituent element may also be classified so as to execute even more processes.

In addition, each control unit may be built from hardware (an ASIC, GPU, etc.). Still further, the processing of each control unit may be executed by one piece of hardware, or by a plurality of pieces of hardware.

[Operation Description]

Figure 8:
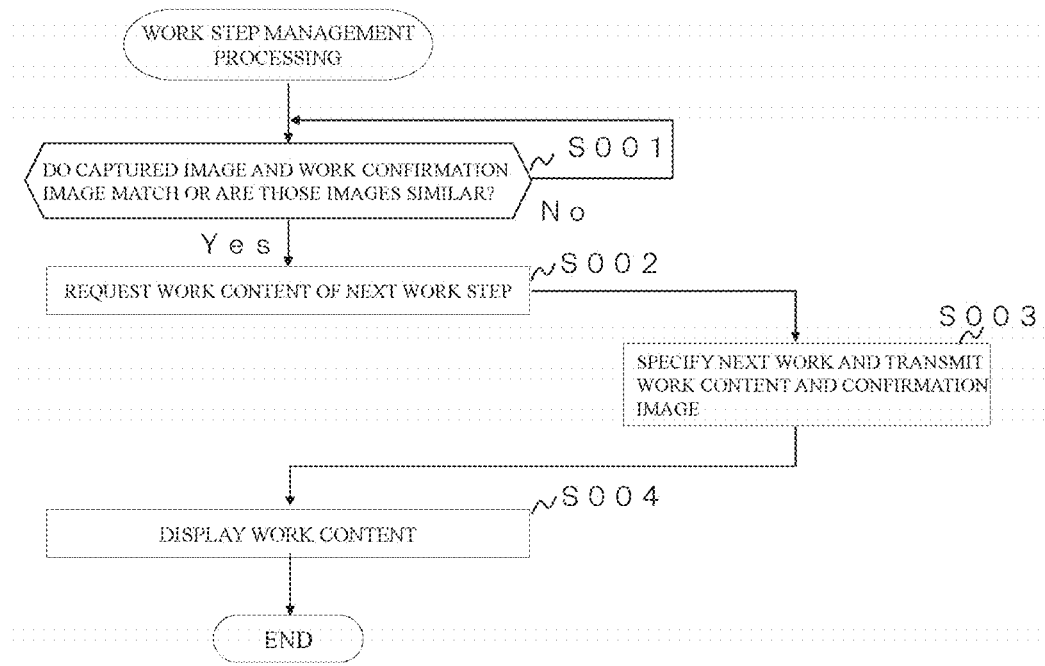
FIG. 8 illustrates a flow of work step management processing.

Next, operation of the work defect prevention system 1 according to this embodiment is described. FIG. 8 is a flow diagram of work step management processing according to this embodiment.

The work step management processing is started when the work defect prevention terminal 100 and the work management apparatus 200 are in a startup state, and a predetermined startup instruction is received by the work defect prevention terminal 100.

First, the device comparison unit 234 determines whether or not an image captured by the work defect prevention terminal 100 and a work confirmation image match or are similar (Step S001). Specifically, the image reception unit 231 receives an image transmitted from the work defect prevention terminal 100. Then, the instruction target specification unit 232 specifies an object corresponding to a finger of the worker 10 in the received image. Then, the instruction target specification unit 232 specifies a direction indicated by a finger tip of the object recognized as being a finger, and specifies the device present in that direction on the image. Then, the instruction target specification unit 232 specifies and receives from the work procedure storage unit 252 the confirmation image 252D of the work target associated with the applicable work step, and specifies the same device for the received confirmation image too. Then, the device comparison unit 234 determines whether the captured image and the work confirmation image are similar or not using the similarity in positional relationship of a characteristic point of the devices specified in the respective images, for color, the existence of a pattern in the same color, for size, the similarity to an estimated value calculated from the distance and angle of view of the object, or a combination of those.

When the captured image and the work confirmation image are not similar ("No" in Step S001), the device comparison unit 234 returns the processing to Step S001.

When the captured image and the work confirmation image are similar ("Yes" in Step S001), the work record verification unit 260 issues to the display instruction unit 233 a request to transmit to the work defect prevention terminal 100 the work content for the next work step (Step S002).

The display instruction unit 233 receives the request from the work record verification unit 260, specifies the next work, and transmits the work content and the confirmation image (Step S003). Specifically, the display instruction unit 233 refers to the work procedure storage unit 252 to specify the work having the next work identifier of the applicable work, and transmits the relevant worker 252B, work content 252C, and confirmation image 252D to the work defect prevention terminal 100.

The image superimposing unit 152 of the work defect prevention terminal 100 displays the work content (Step S004). Specifically, the image superimposing unit 152 outputs an image for superimposed display by reading the confirmation image from among the received information, and instructs the wearer display unit 121 to display the output image. The wearer display unit 121 displays the instructed image to the wearer.

The flow of the work step management processing is described above. According to the work step management processing, when work to be carried out by the worker 10 wearing the work defect prevention terminal 100 matches or has a predetermined level of similarity or more to the confirmation image, the work step is determined to proceed normally and information about the next work can be presented to the worker.

Figure 9:
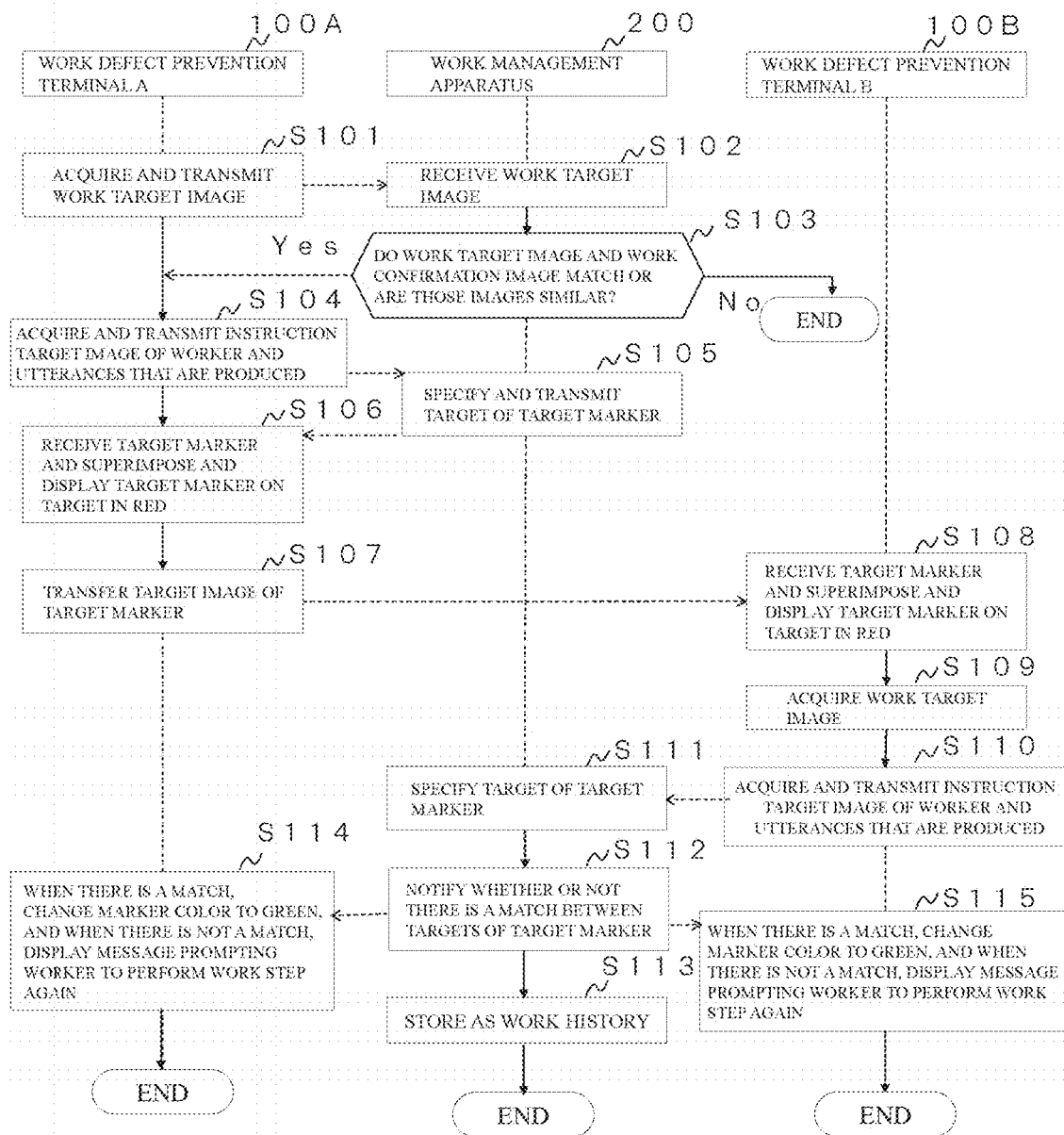
FIG. 9 illustrates a sequence of work defect prevention processing.

FIG. 9 illustrates a sequence of work defect prevention processing according to this embodiment. The sequence illustrated in FIG. 9 includes the work management apparatus 200, a work defect prevention terminal A 100A, and a work defect prevention terminal B 100B. FIG. 9 is described based on a case in which a worker 10 is wearing the work defect prevention terminal A 100A, and another worker 10 is wearing the work defect prevention terminal B 100B.

First, the image acquisition unit 151 of the work defect prevention terminal A 100A acquires and transmits the work target image (Step S101). Specifically, the image acquisition unit 151 acquires the image of the device on which the worker 10 is to carry out work, and transmits the acquired image to the work management apparatus 200.

The image reception unit 231 of the work management apparatus 200 receives the work target image (Step S102).

Then, the device comparison unit 234 determines whether or not the received work target image and the work confirmation image match or are similar (Step S103). Specifically, the image reception unit 231 receives an image transmitted from the work defect prevention terminal 100. Then, the instruction target specification unit 232 specifies an object corresponding to a finger of the worker 10 in the received image. Then, the instruction target specification unit 232 specifies a direction indicated by a finger tip of the object recognized as being a finger, and specifies the device present in that direction on the image. Then, the instruction target specification unit 232 specifies and receives from the work procedure storage unit 252 the confirmation image 252D of the work target associated with the applicable work step, and specifies the same device for the received confirmation image too. Then, the device comparison unit 234 determines whether the captured image and the work confirmation image are similar or not using the similarity in positional relationship of a characteristic point of the devices specified in each image, for color, the existence of a pattern in the same color, for size, the similarity to an estimated value calculated from the distance and angle of view of the object, or a combination of those. When the captured image and the work confirmation image are similar or match ("Yes" in Step S103), the device comparison unit 234 notifies the work defect prevention terminal 100A of that fact.

Note that, when the captured image and the work confirmation image are not similar ("No" in Step S103), the device comparison unit 234 finishes the work defect prevention processing.

The image acquisition unit 151 and the audio processing unit 160 of the work defect prevention terminal A 100A respectively acquire and transmit to the work management apparatus 200 an instruction target image of the worker 10 and audio information about utterances that are produced (Step S104).

The image reception unit 231 and the audio processing unit 220 of the work management apparatus 200 specify and transmit the target of a target marker (Step S105). Specifically, the image reception unit 231 receives an image. Then, the instruction target specification unit 232 specifies an object corresponding to a finger of the worker 10 in the received image. Then, the instruction target specification unit 232 specifies a direction indicated by the finger tip of the object recognized as being a finger, and specifies the device present in that direction on the image. Then, the audio processing unit 220 receives audio information, and determines whether or not the received audio information includes a predetermined utterance (e.g., a message such as "Starting work on this device now." etc., or a cry of "OK" etc.). When a predetermined utterance is included in the audio information, the display instruction unit 233 instructs the work defect prevention terminal A 100A to superimpose and display a conspicuous mark with the specified device as the target of the target marker at a point having a predetermined positional relationship with that device.

The image superimposing unit 152 receives the target marker and superimposes and displays a predetermined graphic at the instructed position in a predetermined color (e.g., red) on the target of the marker (Step S106). Specifically, the image superimposing unit 152 receives information about the device to be the target of the target marker, and instructs the wearer display unit 121 to superimpose and display the predetermined graphic at the instructed position in a predetermined color (e.g., translucent red) on the target of the marker. The wearer display unit 121 recognizes the device at the instructed position, marks that device with a predetermined color such as translucent red, and superimposes and outputs the image.

Then, the communication unit 170 transfers the target image of the target marker (Step S107). Specifically, the communication unit 170 transfers to the work defect prevention terminal B 100B the information about the target marker transmitted in Step S105. Note that, to specify the work defect prevention terminal B 100B as the transfer destination, the work defect prevention terminal A 100A may be associated with the work defect prevention terminal B 100B in advance, or the transfer may be carried out on condition that the work defect prevention terminal B 100B is in a communicable range by short-distance wireless communication, such as a wireless LAN, NFC, and Bluetooth.

The image superimposing unit 152 of the work defect prevention terminal B 100B receives the target marker and superimposes and displays a predetermined graphic at the instructed position in a predetermined color (e.g., red) on the target of the marker (Step S108). Specifically, the image superimposing unit 152 receives information about the device to be the target of the target marker, and instructs the wearer display unit 121 to superimpose and display the predetermined graphic at the instructed position in a predetermined color (e.g., translucent red) on the target of the marker. The wearer display unit 121 recognizes the device at the instructed position, marks that device with a predetermined color such as translucent red, and superimposes and outputs the image.

Then, the image acquisition unit 151 of the work defect prevention terminal B 100B acquires the work target image (Step S109). Specifically, the image acquisition unit 151 acquires the image of the device on which work is to be carried out.

Then, the image acquisition unit 151 and the audio processing unit 160 of the work defect prevention terminal B 100B respectively acquire and transmit to the work management apparatus 200 an instruction target image of the worker 10 and audio information about utterances that are produced (Step S110).

The image reception unit 231 and the audio processing unit 220 of the work management apparatus 200 specify the target of a target marker (Step S111). Specifically, the image reception unit 231 receives an image. Then, the instruction target specification unit 232 specifies an object corresponding to a finger of the worker 10 in the received image. Then, the instruction target specification unit 232 specifies a direction indicated by the finger tip of the object recognized as being a finger, and specifies the device present in that direction on the image. Then, the audio processing unit 220 receives audio information, and determines whether or not the received audio information includes a predetermined utterance (e.g., a message such as "Yes, that is correct." etc., or a cry of "OK" etc.). When a predetermined utterance is included in the audio information, the device comparison unit 234 advances the processing.

The device comparison unit 234 notifies whether or not there is a match between the targets of the target marker (Step S112). Specifically, the device comparison unit 234 determines whether or not there is a match between the target of the target marker specified in Step S105 and the target of the target marker specified in Step S111. The determination regarding whether or not there is a match is performed using the similarity in positional relationship of a characteristic point of each of the target devices, for color, the existence of a pattern in the same color, and for size, the similarity to an estimated value calculated from the distance and angle of view of the object, or using a combination of those. Regardless of whether or not there is a match, the device comparison unit 234 notifies the work defect prevention terminal A 100A and the work defect prevention terminal B 100B of the determination result.

Then, when the received result indicates a match, the image superimposing unit 152 of the work defect prevention terminal A 100A instructs the wearer display unit 121 to change the marker color to a different color (e.g., green). When the received result does not indicate a match, the image superimposing unit 152 of the work defect prevention terminal A 100A instructs the wearer display unit 121 to display a message prompting the worker to perform the work step again, and finishes the work defect prevention processing (Step S114).

Further, when the received result indicates a match, the image superimposing unit 152 of the work defect prevention terminal B 100B instructs the wearer display unit 121 to change the marker color to a different color (e.g., green). When the received result does not indicate a match, the image superimposing unit 152 of the work defect prevention terminal B 100B instructs the wearer display unit 121 to display a message prompting the worker to perform the work step again, and finishes the work defect prevention processing (Step S115).

The flow of the work defect prevention processing is described above. According to the work defect prevention processing, display enabling work to start is not provided unless a plurality of workers produce a predetermined utterance while instructing the same device. Consequently, the risk of carrying out work on the wrong device can be reduced.

Figure 10:
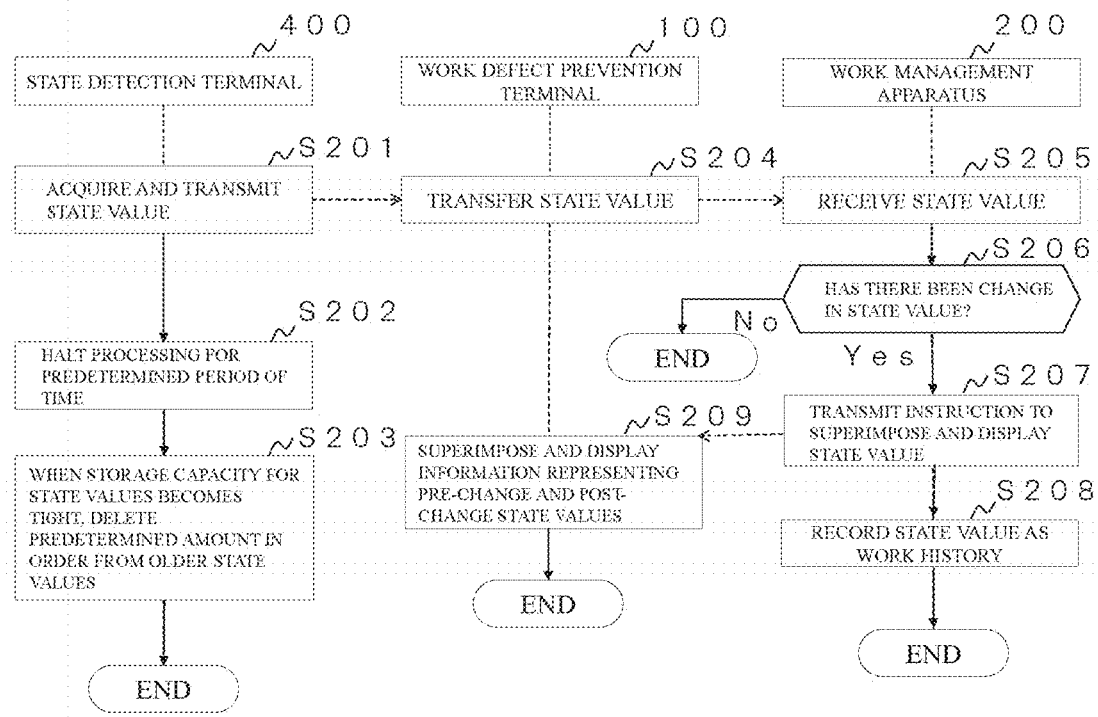
FIG. 10 illustrates a flow of work record verification processing.

FIG. 10 illustrates a flow of work record verification processing according to this embodiment. The flow illustrated in FIG. 10 employs the state detection terminal 400, the work management apparatus 200, and the work defect prevention terminal 100. FIG. 10 is described based on a case in which the worker 10 is wearing the work defect prevention terminal 100, and is operating the work defect prevention terminal 100 in association with the state detection terminal 400.

The state information acquisition unit 411 acquires and transmits a state value (Step S201). Specifically, the state information acquisition unit 411, which has been set in advance to detect a predetermined physical quantity, detects the predetermined physical quantity, for example, electric field intensity. Then, the state information transmission unit 412 transmits the detected physical quantity to the work defect prevention terminal 100.

Then, after the predetermined physical quantity has been acquired, the state information acquisition unit 411 halts the processing for a predetermined period of time (Step S202).

Then, when the storage capacity for the state values becomes tight, the state information acquisition unit 411 deletes a predetermined amount in order from older state values (Step S203). Specifically, when the information amount stored as state values exceeds a predetermined level (e.g., a level corresponding to 90% of capacity), the state information acquisition unit 411 reduces the stored information amount by preferentially deleting information having an older acquisition date and time to secure enough capacity to store the newest acquired state values. Alternatively, like for a circular file, when a predetermined size of a memory has been consumed, past information may be overwritten by the acquired information by returning to a predetermined top position.

Then, the image superimposing unit 152 of the work defect prevention terminal 100 transmits the acquired state value to the work management apparatus 200 (Step S204).

Then, the work record verification unit 260 of the work management apparatus 200 receives the state value (Step S205).

Then, the work record verification unit 260 determines whether or not there has been a change in the state value (Step S206). Specifically, the work record verification unit 260 determines whether or not there has been a change of a predetermined amount or more in the state value by comparing this state value with the immediately preceding state value. Examples of such a change may include when the electric field suddenly decreases from 10 V/m to 2 V/m and when the sound level suddenly decreases from 40 decibels to 20 decibels. When there has been no change or a minor change equal to or less than the predetermined amount in the state value, the work record verification unit 260 finishes the work record verification processing.

When there has been a change in the state value ("Yes" in Step S206), the display instruction unit 233 transmits instruction information to the work defect prevention terminal 100 to superimpose and display the state value on the work defect prevention terminal 100 (Step S207).

Then, the work record verification unit 260 records the state value as a work history (Step S208). Specifically, regarding the work being carried out in the work history storage unit 251, the work record verification unit 260 writes the information about the post-change state 251J by writing the information received in Step S205 as the value of the post-change state 251J. Then, the work record verification unit 260 finishes the work record verification processing.

Further, the image superimposing unit 152 of the work defect prevention terminal 100 superimposes and displays information representing the pre-change and post change state values (Step S209). Then, the image superimposing unit 152 of the work defect prevention terminal 100 finishes the work record verification processing.

The processing flow of the work record verification processing is described above. Performing the work record verification processing enables a determination to be made based on a superimposed displayed image regarding whether or not the proper work has been carried out on the work target.

Figure 11:
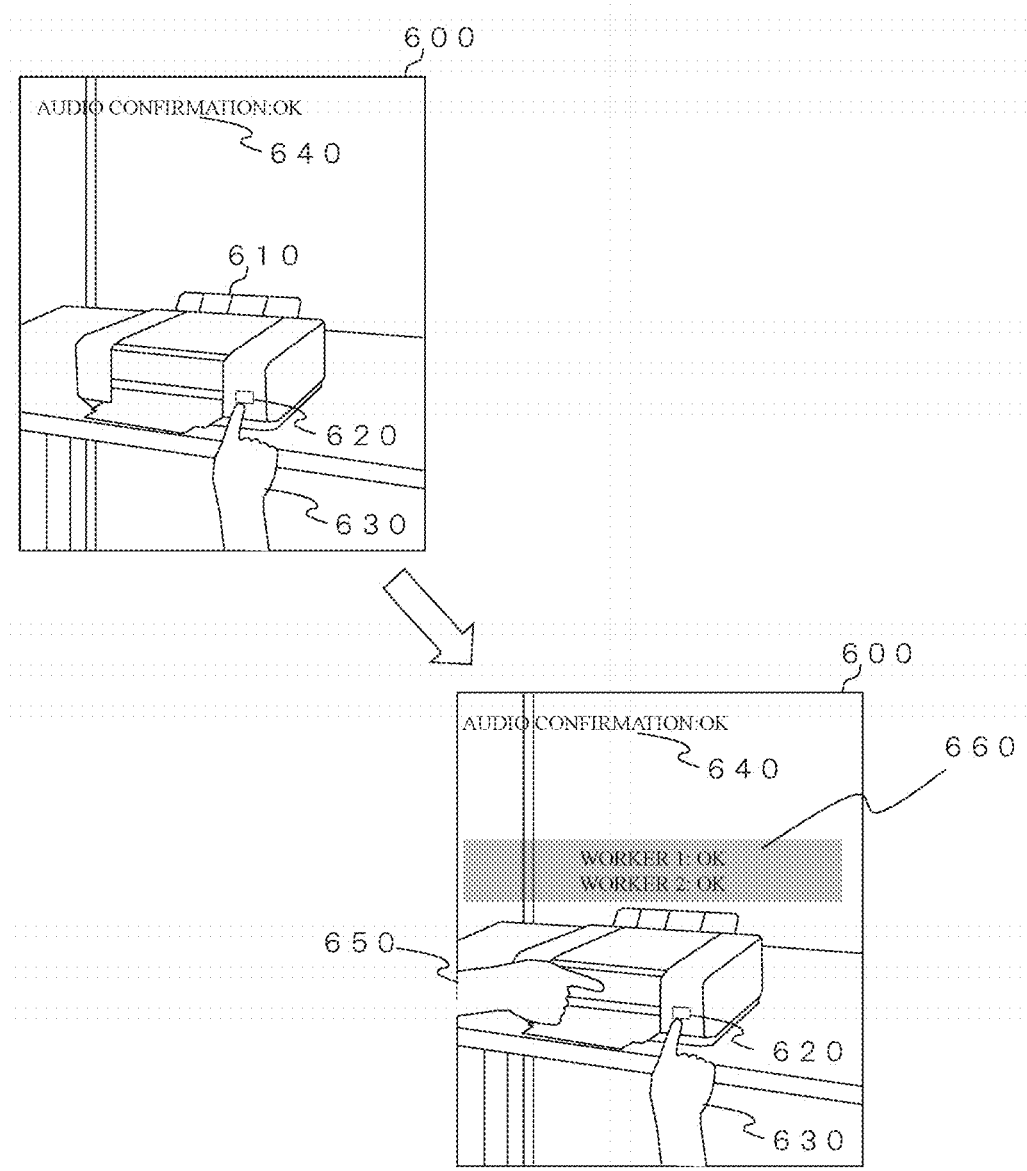
FIG. 11 illustrates an example of a message to be superimposed and displayed during work defect prevention processing.

FIG. 11 illustrates an example of a message to be superimposed and displayed during work defect prevention processing. When an operation button 620 of a work target device 610 is the work target, a finger of a worker 10A points to the operation button 620 on an image 600, and a message 640 "AUDIO RECOGNITION: OK", which indicates that it has been determined based on audio recognition that the proper utterance has been made, is superimposed and displayed. Further, when the operation button 620 of the above-mentioned device indicated by a finger 650 of a different worker 10B is the same, a message "Worker 1: OK, Worker 2: OK" is additionally superimposed and displayed.

Figure 12:
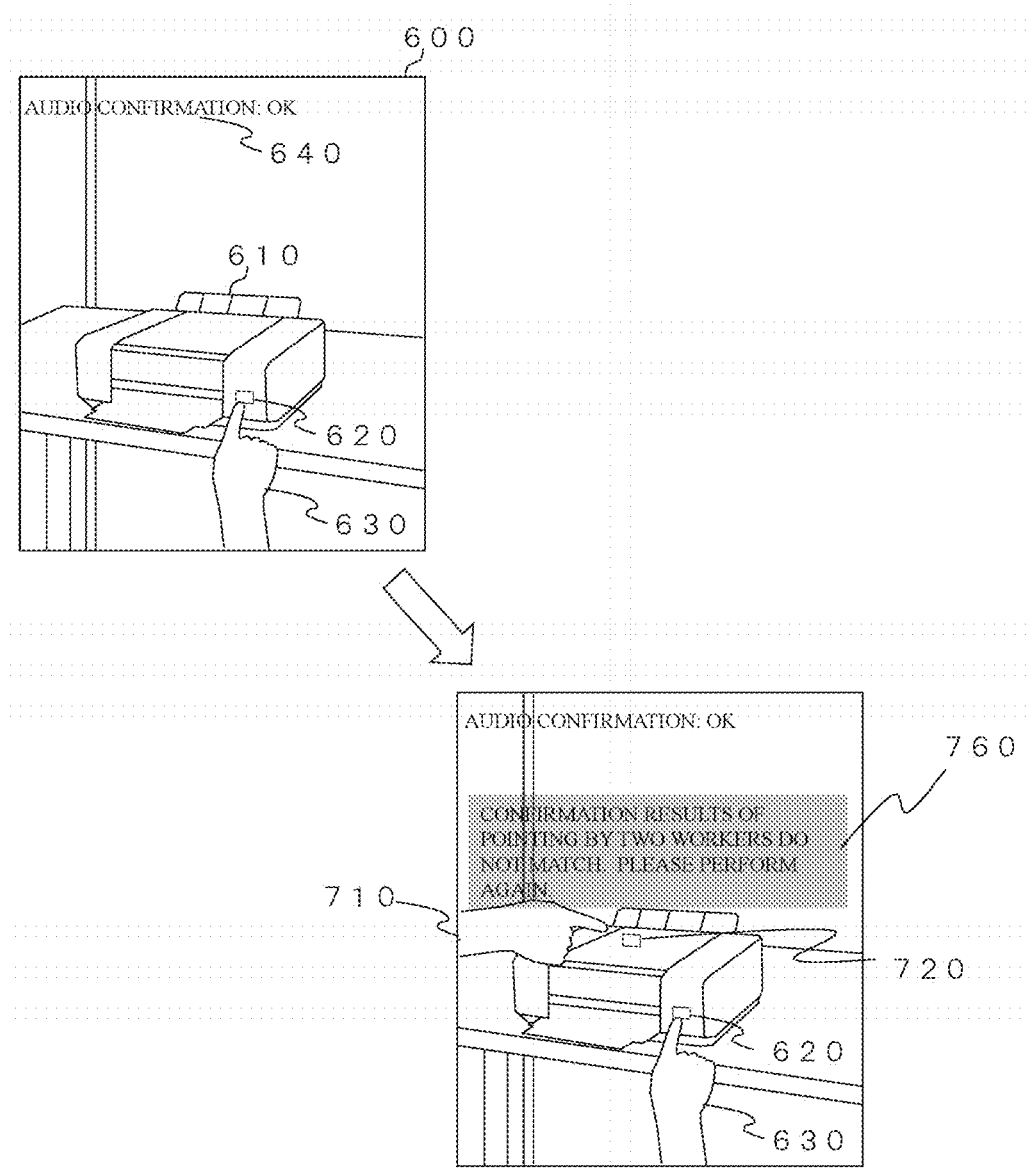
FIG. 12 illustrates an example of a message to be superimposed and displayed during the work defect prevention processing.

FIG. 12 illustrates an example of a message to be superimposed and displayed when there is not a match during the work defect prevention processing. When the operation button 620 of the work target device 610 is the work target, the finger of the worker 10A points to the operation button 620 on the image 600, and the message 640 "Audio recognition: OK", which indicates that it has been determined based on audio recognition that the proper utterance has been made, is superimposed and displayed. Further, when an object indicated by a finger 710 of the different worker 10B is an operation button 720, and not the operation button 620, namely, when there is not a match, a message such as a message 760 "CONFIRMATION RESULTS OF POINTING BY THE TWO WORKERS DO NOT MATCH. PLEASE PERFORM AGAIN." is additionally superimposed and displayed.

Figure 13:
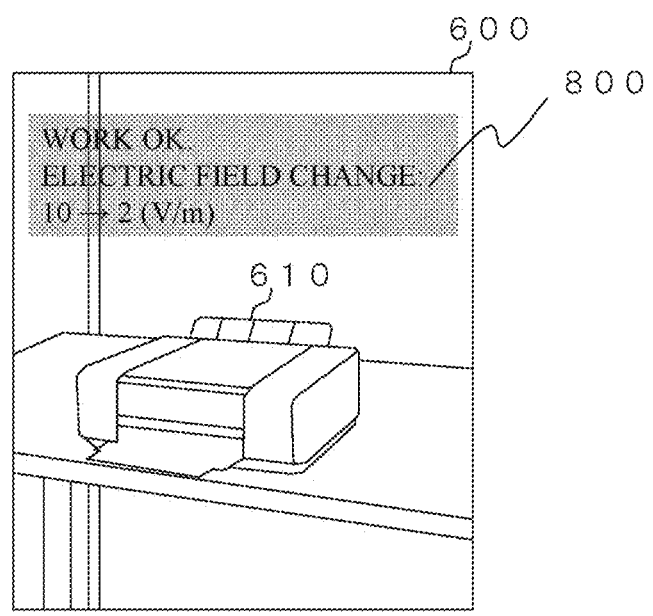
FIG. 13 illustrates an example of a message to be superimposed and displayed during the work defect prevention processing.

FIG. 13 illustrates an example of a message to be superimposed and displayed during the work defect prevention processing. When there has been a change in a predetermined physical quantity acquired by the work record verification processing by carrying out the work, a message 800 "Work: OK, Change to electric field: From 10 to 2 (V/m)" is superimposed and displayed.

The work defect prevention system 1 according to the first embodiment of the present invention is described above. According to the first embodiment, work that better matches a unique work environment can be supported.

The present invention is not limited to the above-mentioned first embodiment. Further, various changes may be made to the first embodiment within the scope of the technical concept of the present invention. For example, in the first embodiment, the work defect prevention terminal 100 is described based on the example of a wearable device in the form of a pair of glasses. However, the present invention is not limited to such a device. For example, the work defect prevention terminal 100 may be a helmet-type wearable device covering a wider area of the worker's head, or may be a wearable device that is mounted to only one eye. Further, the work defect prevention terminal 100 and the work management apparatus 200 may be integrated.

Figure 14:
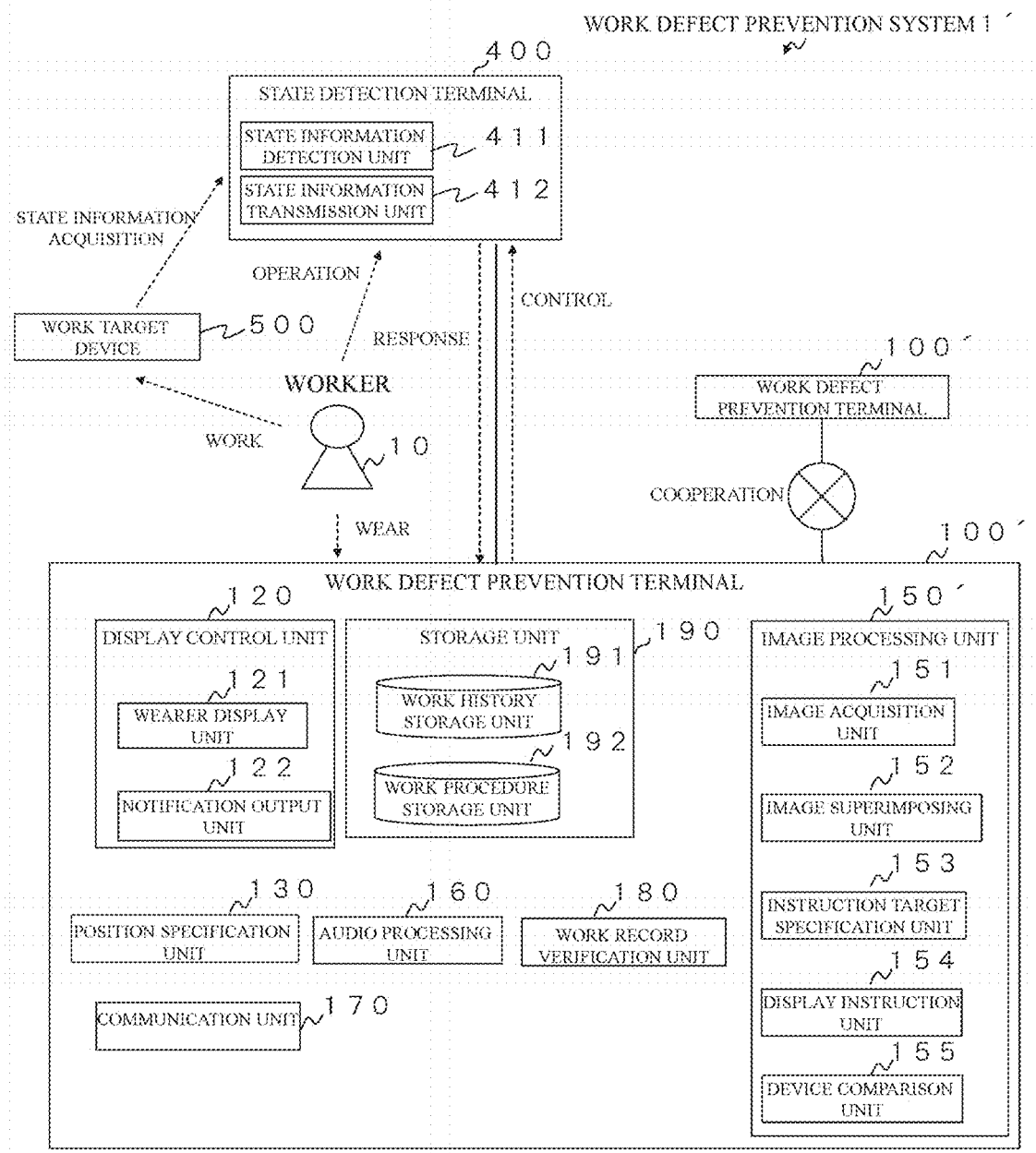
FIG. 14 illustrates a configuration example of a work defect prevention system according to a second embodiment of the present invention.

Of such modified examples, FIG. 14 illustrates a configuration example of a work defect prevention system according to a second embodiment of the present invention. In the second embodiment, work defect prevention terminals 100' cooperate with each other. FIG. 14 illustrates a modified example in which the processing carried out by the work management apparatus 200 can be carried out on the work defect prevention terminals 100' side. In other words, a modified example is described in which, for example, work defect prevention terminals communicate with each other via local wireless equipment in order to prevent work defects.

In FIG. 14, the work defect prevention terminals 100' are provided instead of the work defect prevention terminal 100. The work defect prevention terminals 100' have basically the same configuration as the work defect prevention terminal 100 described in the first embodiment. Therefore, in the following description of the work defect prevention system 1' according to the second embodiment, parts that are the same as in the first embodiment are denoted using the same reference numerals.

The work defect prevention terminal 100' includes the display control unit 120, the position specification unit 130, an image processing unit 150', the audio processing unit 160, the communication unit 170, a work record verification unit 180, and a storage unit 190.

The image processing unit 150' includes an image acquisition unit 151, an image superimposing unit 152, an instruction target specification unit 153, a display instruction unit 154, and a device comparison unit 155. The instruction target specification unit 153, the display instruction unit 154, and the device comparison unit 155 perform the same processing as the instruction target specification unit 232, the display instruction unit 233, and the device comparison unit 234 included in the work management apparatus 200 according to the first embodiment, respectively.

The work record verification unit 180 performs the same processing as the work record verification unit 260 included in the work management apparatus 200 according to the first embodiment.

The storage unit 190 includes a work history storage unit 191 and a work procedure storage unit 192. The work history storage unit 191 and the work procedure storage unit 192 have the same data structure as the work history storage unit 251 and the work procedure storage unit 252 included in the work management apparatus 200 according to the first embodiment, respectively.

The work defect prevention system 1' according to the second embodiment has been described above. The work defect prevention system 1' according to the second embodiment enables confirmation of the instruction target to be performed by the work defect prevention terminals 100' themselves even in a region and the like in which signal reception is poor and the Internet and the like cannot be connected to, for example.

The present invention is described above by way of the first and second embodiments. The technical elements of the above-mentioned embodiments may be applied independently or divided into a plurality of components, such as program components and hardware components.

The present invention has been described above by mainly focusing on the embodiment.

REFERENCE SIGNS LIST

1 . . . work defect prevention system, 10 . . . worker, 100 . . . work defect prevention terminal, 120 . . . display control unit, 130 . . . position specification unit, 140 . . . work information storage unit, 150 . . . image processing unit, 160 . . . audio processing unit, 170 . . . communication unit: 200 . . . work management apparatus, 210 . . . display unit, 220 . . . audio processing unit, 230 . . . image processing unit, 240 . . . communication unit, 250 . . . storage unit, 260 . . . work record verification unit, 400 . . . state detection terminal, 411 . . . state information acquisition unit, 412 . . . state information transmission unit, 500 . . . work target device

The invention claimed is:

1. A work management apparatus, comprising:
   an image reception unit configured to receive an image from another apparatus;
   an instruction target specification unit configured to specify a device instructed by a predetermined instruction method in the received image;
   a display instruction unit configured to instruct the another apparatus to display the device specified by the instruction target specification unit in a different display mode from a display mode of another device contained in the image; and
   a device comparison unit configured to determine whether or not the device specified by the instruction target specification unit matches a device that is contained in another image different from the image and that has been instructed by the predetermined instruction method,
   wherein the display instruction unit is configured to instruct the another apparatus to display a comparison result obtained by the device comparison unit.

2. The work management apparatus according to claim 1, further comprising a storage unit configured to store image information specifying a work procedure and a device to be a work target,
   wherein the display instruction unit is configured to issue the instruction to the another apparatus when the device specified by the instruction target specification unit matches the device to be the work target.

3. The work management apparatus according to claim 1, wherein the display instruction unit is configured to instruct the another apparatus to display the device so that the display mode applied during processing for displaying the device differently from another device differs from a display mode applied when it has been determined by the device comparison unit that the device and the another device match.

4. The work management apparatus according to claim 1, further comprising a device comparison unit configured to determine whether or not the device specified by the instruction target specification unit matches each of devices that are contained in a plurality of other images different from the image and that have been instructed by the predetermined instruction method,
   wherein the display instruction unit is configured to instruct the another apparatus to display a comparison result obtained by the device comparison unit.

5. The work management apparatus according to claim 4, wherein the display instruction unit is configured to instruct the another apparatus to display the device so that the display mode applied during processing for displaying the device differently from another device differs from a display mode applied when it has been determined by the device comparison unit that the device and the another device match.

6. The work management apparatus according to claim 1, wherein the display instruction unit is configured to instruct the another apparatus to display a pre-change physical quantity and a post-change physical quantity when there has been a change of a predetermined amount or more in state information about the device representing a predetermined physical quantity.

7. The work management apparatus according to claim 1, wherein the instruction target specification unit is configured to recognize a shape of a finger contained in the image, and specify a device present in a direction indicated by the shape on the image.

8. The work management apparatus according to claim 1, wherein the instruction target specification unit is configured to recognize light having a predetermined frequency contained in the image, and specify a device present in a direction indicated by the light on the image.

9. A work defect prevention method for supporting work defect prevention through use of a computer, the computer comprising a hardware processor, the work defect prevention method comprising:
   an image reception step of receiving, by the hardware processor, an image from another apparatus;
   an instruction target specification step of specifying, by the hardware processor, a device instructed by a predetermined instruction method in the received image;
   a display instruction step of instructing, by the hardware processor, the another apparatus to display the device specified in the instruction target specification step in a different display mode from a display mode of another device contained in the image; and
   a device comparison step of determining whether or not the device specified in the instruction target specification step matches a device that is contained in another image different from the image and that has been instructed by the predetermined instruction method,
   wherein the display instruction step instructs the another apparatus to display a comparison result obtained in the device comparison step.

10. A work management apparatus, comprising:
    an image reception unit configured to receive an image from another apparatus;
    an instruction target specification unit configured to specify a device instructed by a predetermined instruction method in the received image;
    a display instruction unit configured to instruct the another apparatus to display the device specified by the instruction target specification unit in a different display mode from a display mode of another device contained in the image; and
    a device comparison unit configured to determine whether or not the device specified by the instruction target specification unit matches each of devices that are contained in a plurality of other images different from the image and that have been instructed by the predetermined instruction method,
    wherein the display instruction unit is configured to instruct the another apparatus to display a comparison result obtained by the device comparison unit.

11. The work management apparatus according to claim 10, wherein the display instruction unit is configured to instruct the another apparatus to display the device so that the display mode applied during processing for displaying the device differently from another device differs from a display mode applied when it has been determined by the device comparison unit that the device and the another device match.

* * * * *